(12) United States Patent
Grigoriev

(10) Patent No.: US 9,088,624 B2
(45) Date of Patent: Jul. 21, 2015

(54) METHOD AND APPARATUS FOR ROUTING NOTIFICATION MESSAGES

(75) Inventor: Nikolai Grigoriev, Brossard (CA)

(73) Assignee: Nokia Technologies Oy, Espoo (FI)

( * ) Notice: Subject to any disclaimer, the term of this patent is extended or adjusted under 35 U.S.C. 154(b) by 853 days.

(21) Appl. No.: 13/149,421

(22) Filed: May 31, 2011

(65) Prior Publication Data
US 2012/0311046 A1    Dec. 6, 2012

(51) Int. Cl.
| | |
|---|---|
| *G06F 15/16* | (2006.01) |
| *H04L 29/08* | (2006.01) |
| *H04W 4/12* | (2009.01) |
| *H04L 12/725* | (2013.01) |
| *H04L 12/58* | (2006.01) |

(52) U.S. Cl.
CPC ............ *H04L 67/303* (2013.01); *H04L 45/308* (2013.01); *H04L 51/24* (2013.01); *H04W 4/12* (2013.01); *H04L 51/38* (2013.01); *H04L 67/26* (2013.01)

(58) Field of Classification Search
CPC ....................................................... H04L 67/26
USPC ......................................... 709/206, 227, 228
See application file for complete search history.

(56) References Cited

U.S. PATENT DOCUMENTS

| | | | |
|---|---|---|---|
| 7,284,034 B2 | 10/2007 | Matsa et al. | |
| 7,949,328 B2 | 5/2011 | Jiang | |
| 7,991,424 B2 | 8/2011 | Batni et al. | |
| 8,301,132 B1 * | 10/2012 | Reeves et al. | 455/418 |
| 2002/0112014 A1 | 8/2002 | Bennett et al. | |
| 2004/0116119 A1 | 6/2004 | Lewis et al. | |
| 2006/0246878 A1 | 11/2006 | Khoury | |
| 2007/0294336 A1 | 12/2007 | Pounds et al. | |
| 2008/0065688 A1 | 3/2008 | Shenfield | |
| 2010/0227632 A1 | 9/2010 | Bell et al. | |
| 2011/0029598 A1 * | 2/2011 | Arnold et al. | 709/203 |
| 2011/0070901 A1 | 3/2011 | Alward | |

FOREIGN PATENT DOCUMENTS

EP    1 981 294 A1    10/2008

OTHER PUBLICATIONS

D. Tosi et al., "A Platform to Support Anytime, Anywhere, Just-for-me M-Learning", Seventh IEEE International Conference on Advanced Learning Technologies, pp. 114-116, Jul. 18-20, 2007.
International Search Report for PCT/FI2012/050334 dated Jul. 18, 2012, pp. 1-6.
International Written Opinion for PCT/FI2012/050334 dated Jul. 18, 2012, pp. 1-8.

(Continued)

*Primary Examiner* — Mohamed Wasel
(74) *Attorney, Agent, or Firm* — Alston & Bird LLP

(57) ABSTRACT

An approach is presented for facilitating automated processing of targeted (push) notification messages for integration with notification recipients of different type and function. A universal notification platform receives data for identifying one or more notification recipients, one or more attributes of the one or more notification recipients, or a combination thereof. It then processes the data along with one or more other attributes pertaining to one or more service providers of the notification recipients in order to determine one or more rules for specifying routing of one or more notification messages to the one or more notification recipients by one or more information sources.

16 Claims, 9 Drawing Sheets

(56) References Cited

OTHER PUBLICATIONS

S. Agarwal, "Toward a Push-Scalable Global Internet", IEEE Conference on Computer Communications Workshops, pp. 786-791, Apr. 10-15, 2011.

Extended European Search Report for corresponding European Application No. 12794054.2 dated Aug. 10, 2014, 6 pages.

Tag API-Urban Airship documentation [online] [retrieved Feb. 5, 2015 via the Internet Archive Wayback Machine at http:/web.archieve.org/web/20110501034342/http://urbanairship.com/docs/tags.html (May 1, 2011). 3 pages.

* cited by examiner

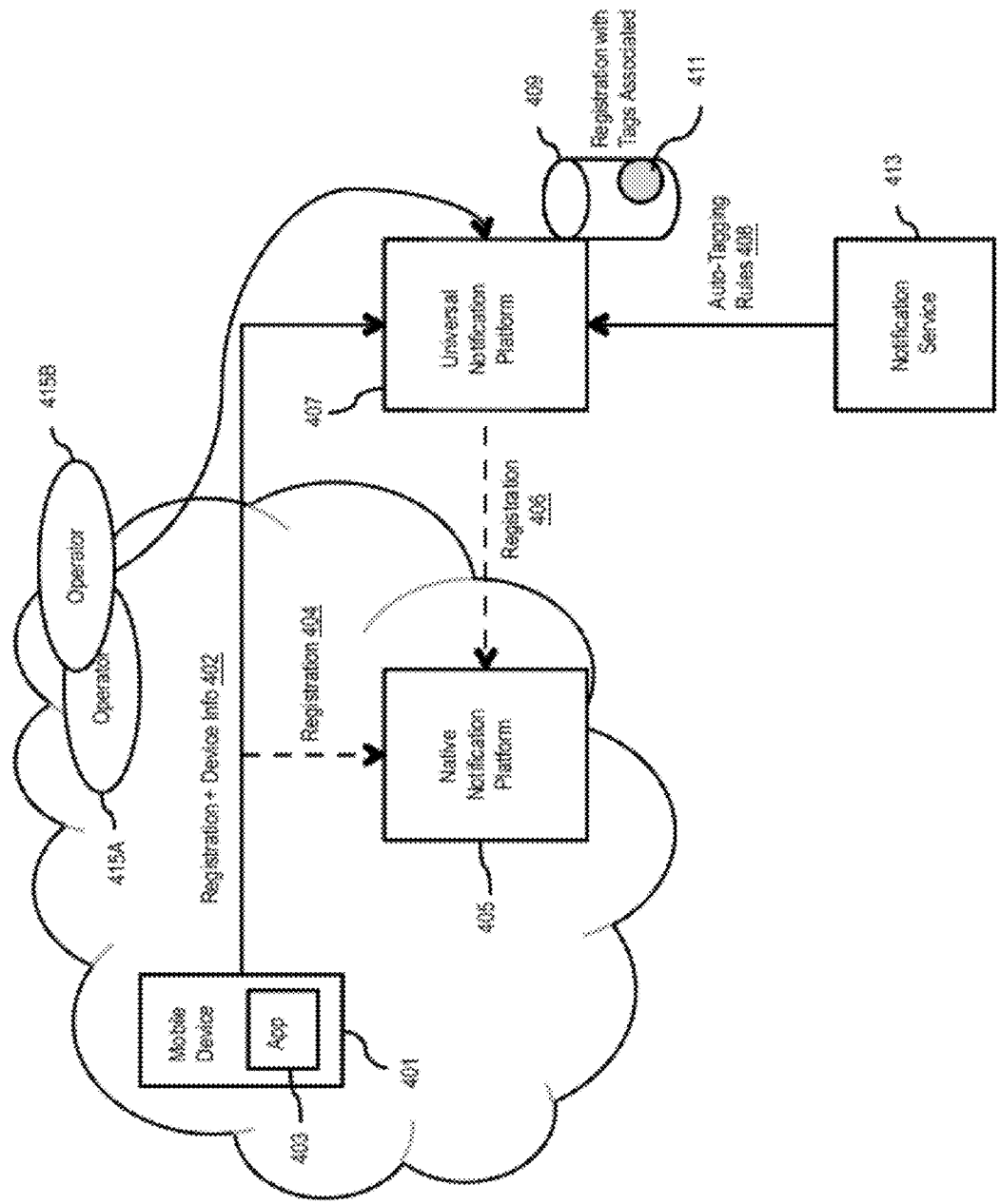

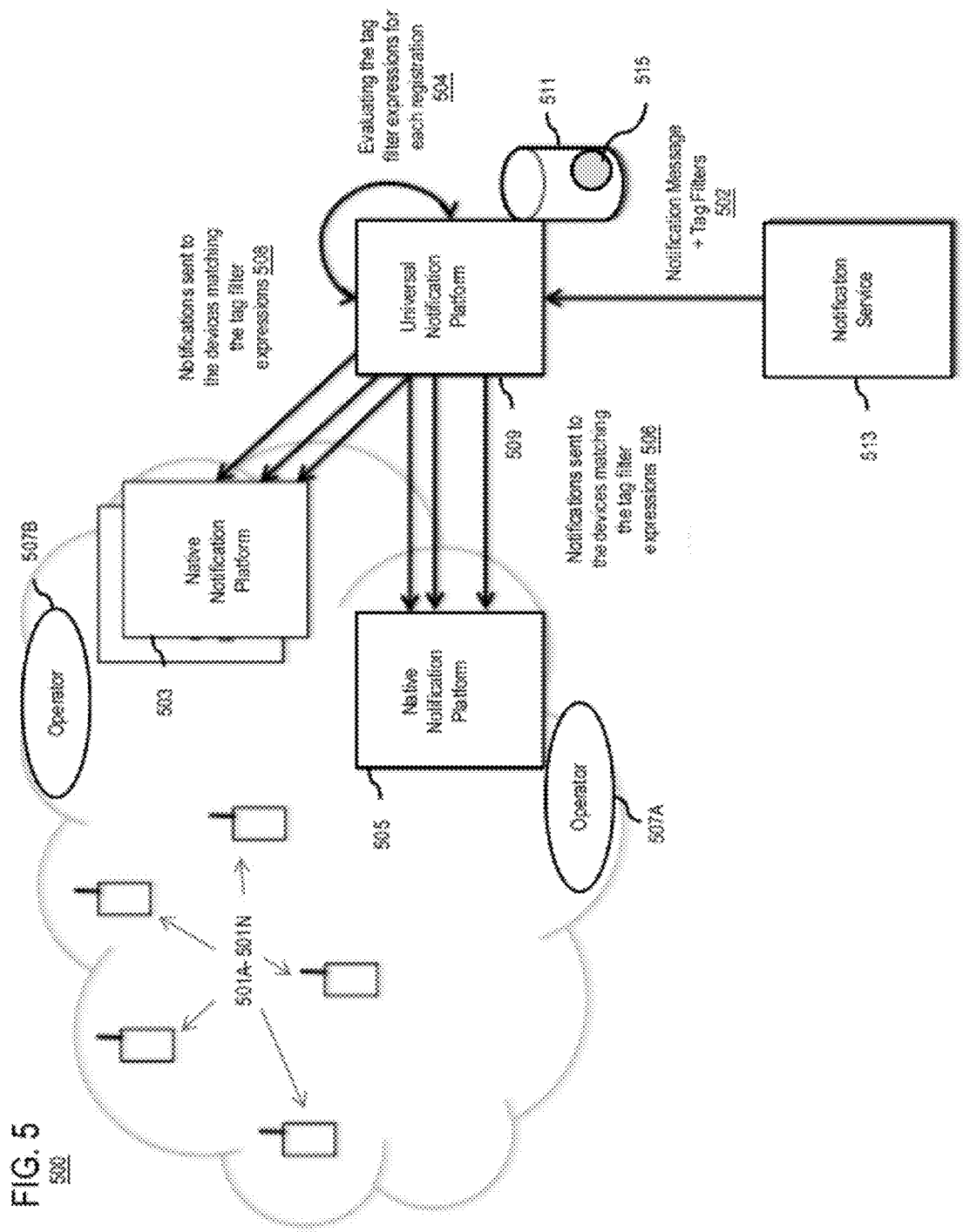

METHOD AND APPARATUS FOR ROUTING NOTIFICATION MESSAGES

BACKGROUND

Service providers and device manufacturers (e.g., wireless, cellular, etc.) are continually challenged to deliver value and convenience to consumers by, for example, providing compelling network services. One area of interest is the development of services for transmitting targeted notification messages to the devices of subscribers to the service. The notification messages may be generated or provided as push messages conforming to various formats for accommodating different device or application types. Given the wide array of differing device types, operating systems and carrier networks to which the devices are configured, the notification messages must be adapted accordingly to ensure delivery. Unfortunately, there is currently no convenient means for ensuring the proper adaptation or generation of singular notification messages to account for the varying requirements and capabilities of the differing devices, applications or services to which the messages are to be directed.

SOME EXAMPLE EMBODIMENTS

Therefore, there is a need for an approach for facilitating automated processing of targeted (push) notification messages for integration with notification recipients of different type and function.

According to one embodiment, a method comprises receiving data for identifying one or more notification recipients, one or more attributes of the one or more notification recipients, or a combination thereof. The method also comprises associating the data with one or more other attributes of one or more service providers associated with a respective of the one or more notification recipients. The method also comprises processing and/or facilitating a processing of the data, the one or more other attributes, or a combination thereof to determine one or more rules for specifying routing of one or more notification messages to the one or more notification recipients by one or more information sources. The method further comprises causing, at least in part, storing of one or more tags in association with the one or more notification recipients based, at least in part, on the one or more rules.

According to another embodiment, an apparatus comprises at least one processor, and at least one memory including computer program code, the at least one memory and the computer program code configured to, with the at least one processor, cause, at least in part, the apparatus to receive data for identifying one or more notification recipients, one or more attributes of the one or more notification recipients, or a combination thereof. The apparatus is also caused to associate the data with one or more other attributes of one or more service providers associated with a respective of the one or more notification recipients. The apparatus is also caused to process and/or facilitate a processing of the data, the one or more other attributes, or a combination thereof to determine one or more rules for specifying routing of one or more notification messages to the one or more notification recipients by one or more information sources. The apparatus is further caused to store one or more tags in association with the one or more notification recipients based, at least in part, on the one or more rules.

According to another embodiment, a computer-readable storage medium carries one or more sequences of one or more instructions which, when executed by one or more processors, cause, at least in part, an apparatus to receive data for identifying one or more notification recipients, one or more attributes of the one or more notification recipients, or a combination thereof. The apparatus is also caused to associate the data with one or more other attributes of one or more service providers associated with a respective of the one or more notification recipients. The apparatus is also caused to process and/or facilitate a processing of the data, the one or more other attributes, or a combination thereof to determine one or more rules for specifying routing of one or more notification messages to the one or more notification recipients by one or more information sources. The apparatus is further caused to store one or more tags in association with the one or more notification recipients based, at least in part, on the one or more rules.

According to another embodiment, an apparatus comprises means for receiving data for identifying one or more notification recipients, one or more attributes of the one or more notification recipients, or a combination thereof. The apparatus also comprises means for associating the data with one or more other attributes of one or more service providers associated with a respective of the one or more notification recipients. The apparatus also comprises means for processing and/or facilitating a processing of the data, the one or more other attributes, or a combination thereof to determine one or more rules for specifying routing of one or more notification messages to the one or more notification recipients by one or more information sources. The apparatus further comprises means for causing, at least in part, storing of one or more tags in association with the one or more notification recipients based, at least in part, on the one or more rules.

According to another embodiment, an apparatus comprises means for providing access for causing, at least in part, data for identifying one or more notification recipients, one or more attributes of the one or more notification recipients, or a combination thereof. The apparatus also comprises means for associating the data with one or more other attributes of one or more service providers associated with a respective of the one or more notification recipients. The apparatus also comprises means for processing and/or facilitating a processing of the data, the one or more other attributes, or a combination thereof to determine one or more rules for specifying routing of one or more notification messages to the one or more notification recipients by one or more information sources. The apparatus further comprises means for causing, at least in part, storing of one or more tags in association with the one or more notification recipients based, at least in part, on the one or more rules.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the recipient side (e.g., a device, an associated service, or application operating thereon), or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram depicting a registration process of the system of FIG. 1, according to one embodiment;

FIG. 5 is a diagram depicting a targeted (push) notification message routing process of the system of FIG. 1, according to one embodiment;

DESCRIPTION OF SOME EMBODIMENTS

Examples of a method, apparatus, and computer program for facilitating automated processing of targeted (push) notification messages for integration with notification recipients (e.g., devices, applications or services) of different type and function are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to notification-enabled services, it is contemplated the approach described herein may be used as, or in connection with, any platform, service, web host or application for facilitating the delivery or generation of content, data, media or the like by way of a communication network. Also, providers of such services (service providers) may include, for example, any software entity that sends notifications (e.g., a weather alert service) to wireless device users, a communication service provider (e.g., cell network operator) that supports intelligent message routing/filtering for its network of cellular subscribers, a generic notification-enabled service provider that delivers messages to recipients on behalf of other service providers, or the like.

Figure 1:
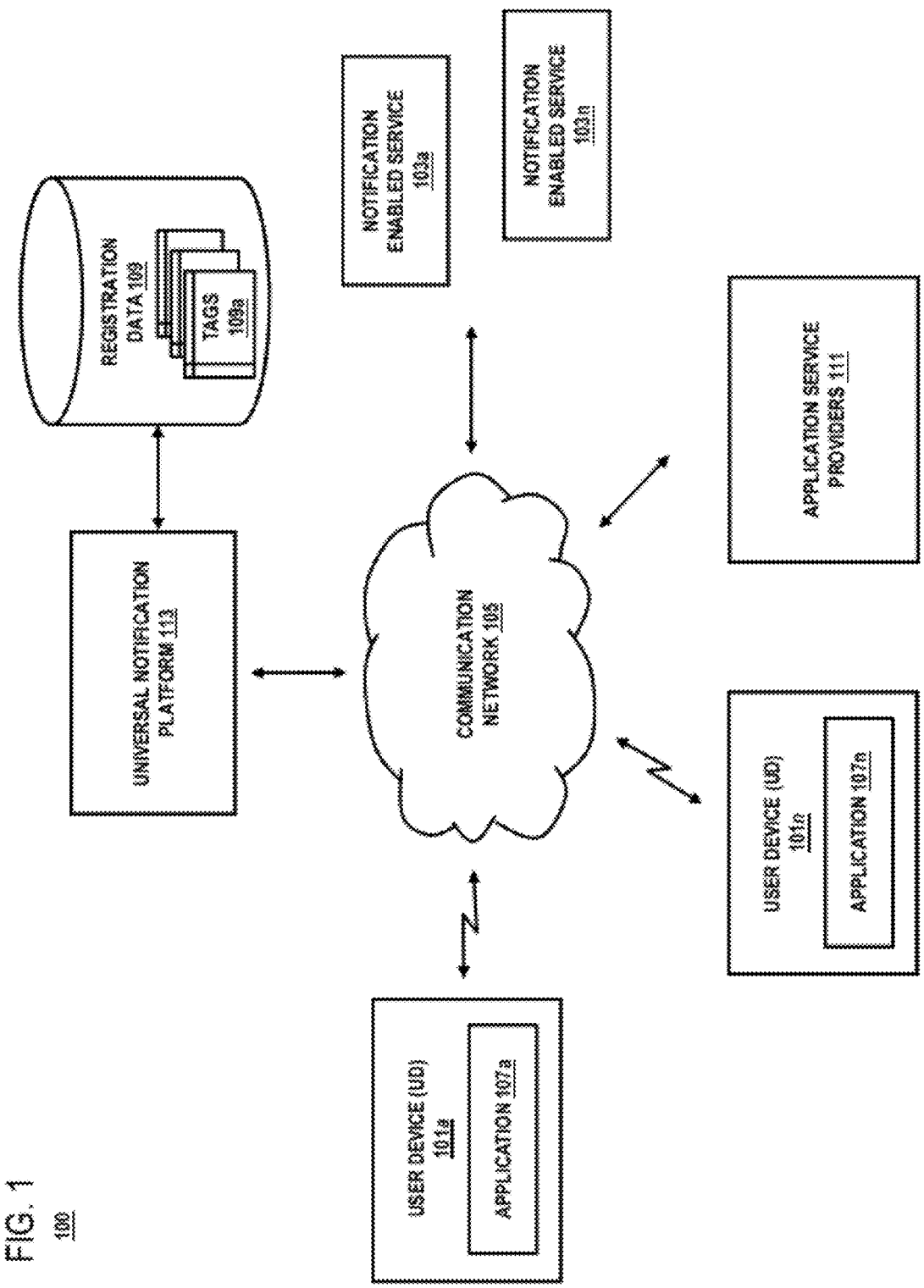
FIG. 1 is a diagram of a system capable of facilitating automated processing of targeted (push) notification messages for integration with notification recipients of different type and function, according to one embodiment.

FIG. 1 is a diagram of a system capable of facilitating automated processing of targeted (push) notification messages for integration with notification recipients of different type and function, according to one embodiment. In certain embodiments, the system enables notification messages sent by the notification-enabled services to be evaluated against one or more logical expressions. The evaluation is performed, based at least in part, on the specified data format indicated as part of the notification message to be delivered. Depending on the result of the evaluation, one or more tags are temporarily associated with each notification recipient (e.g., device application) registered to receive the notifications, including e-mail client applications, short messaging service (SMS) applications and other messaging applications. The tags enable selective routing of the notifications based on associated system, network, carrier, operating system, application and/or device messaging requirements. Still further, the system is configured to account for changing network conditions or device states in order to cause re-evaluation of the notification messages, and hence, the removal or addition of tags.

Targeted, or push messages, include for example network-based communications where the request for a given transaction is initiated by a publisher or central server, i.e., a application service provider having access to one or more notification-enabled services. This is in contrast to pull messages, where the request for transmission of information is initiated by the notification recipient (e.g., client device). Notification recipients receive information via the various notification-enabled services, and whenever new content (a notification message) is available, the notification-enabled service pushes the information out to the list of registered notification recipients. Push messaging architectures, underlying protocols and formats vary, and may include for example, SMS, e-mail, cloud to device messaging (C2DM), Apple® Push Notifications (APN), wireless application protocol (WAP) push and others.

Given the wide array of different notification recipients, protocols, operating systems and carrier networks to which the list of registered notification recipients may be configured, notification-enabled service providers must ensure their push messages are delivered accordingly. For example, if the notification provider wants to send notification messages to only those subscribers who use Apple® iPhone® devices, the provider must separately send a notification to the list of devices that are iPhones. However, for devices based on the Google Android™ operating system (OS), the provider must separately send a separate notification to the list of notification recipients featuring this OS. The list of notification recipients as well as their capabilities and requirements must therefore be maintained by the provider at all times even though the content to be presented via the message is the same. In addition, the provider must persistently track device status changes or query the status of each device before broadcasting the notification to account for network, application, service or device conditions that could affect the delivery of notifications. Unfortunately, this places an additional burden on the service provider, which is only further exacerbated as the list of subscribers grows and/or as different technologies, protocols and architectures are introduced to the market. Currently, there is no solution for supporting the unified delivery of notifications regardless of the technology used to actually deliver the push message.

To address this problem, a system 100 of FIG. 1 introduces the capability to facilitate single push processing of notification messages across notification recipients, such as user devices 101a-101n. The system 100 includes a universal notification platform 113 that is configured to route notification messages as generated by a notification-enabled service 103a-103n to respective recipient devices 101a-101n. The notification-enabled services 103, which may include network or protocol specific push messaging mechanisms (e.g., Short Messaging Service, Apple® Push Notification-enabled service), are relied upon by one or more application service providers 111. The application service providers 111 facilitate transmission of specific data via the services 103 such as traffic alerts, weather alerts, stock data, news data, etc.; the data being transmitted to respective notification recipients/devices relative to a particular push notification requirement.

Devices or notification recipients may include, for example, any hardware, software, firmware or virtual entity to which notification messages may be received and/or processed. For example, this may include a laptop, cellular phone or personal data assistant; an application operable by a laptop, cellular phone or personal data assistant such as an e-mail client, messaging application, etc.; a service such as a third-party messaging solution or web browser application (e.g., applet); or any combination thereof for which the various messages and/or tags may be generated and directed. For example purposes, a device may be taken as synonymous with a notification recipient. The universal notification platform 113 facilitates routing of notification messages generated by respective notification-enabled services 103a-103n to the various notification recipients (e.g., devices 101a-101n) regardless of underlying platform, protocol, etc.

Routing of messages is facilitated by specifying one or more filter expressions and/or conditions of message delivery, wherein the filter expressions and/or conditions are then applied to notification recipients that correspond to (and are specifically tagged) for execution of the condition. In certain embodiments, the universal notification platform 113 is configured to facilitate a "registration" process wherein each user device 101a-101n, which features a respective application 107a-107n for receiving the messages, registers itself with the universal notification platform 113—i.e., as opposed to a respective notification-enabled service 103a-103n. This registration process entails the receipt of a registration request, which includes the sharing of device, user, carrier or other information with the platform 113. For example, each device sends a set of tokens, identifiers or other data for describing various attributes of the device, including a platform/OS name, vendor, platform/OS version number, carrier name and other information. In addition, the universal notification platform 113 may also associate the attributes pertaining to the device 101a-101n with attributes pertaining to properties of the associated device service provider—i.e., mobile network, carrier or operator to which the device is configured. By way of example, the platform 113 may process the request in part by associating, with the request, attributes for indicating the roaming status of the device relative to the carrier network, subscriber home city, subscriber home country, current geo-location and position data, etc.

It is noted that the universal notification platform 113 serves as a proxy or intermediate service (e.g., domain naming service) for use in connection with respective notification-enabled services 103a-103n, the one or more devices 101a-101n, or a combination thereof. As a facilitation mechanism, the universal notification platform 113 enables the notification messages of respective services 103a-103n to be routed to one or more devices 101a-101n on their behalf. Of note, the platform 113 does not require the adherence or enforcement of a particular messaging protocol, but rather, enables the list of recipients to be restricted/filtered without having to specify the delivery method. The specific protocol or transmission method is specified according to what each notification recipient supports, but is not required to enable the tagging process to be facilitated. For the purpose of illustration, the universal notification platform 113 is shown as a separate entity, although in certain embodiments, the platform 113 may be implemented as the notification-enabled service 103a-103n.

In the above described approach, the attributes of the device and/or the service provider associated with the device (e.g., wireless communication provider) may be processed by the universal notification platform 113 for evaluation purposes. For example, each of the attributes (e.g., device OS, carrier network) may be processed and evaluated against one or more rules (tagging rules) for determining or specifying routing of the one or more notification messages received from the notification-enabled services 103a-103n. The rules, which may include instructions for the generation of one or more tags 109a or association of generated tags with a notification recipient, may indicate the conditions and/or criteria for which messages are to be directed to the one or more devices 101a-101n. In certain embodiments, the rules may include one or more logical expressions for evaluating the notification messages with respect to these conditions and/or criteria; these expressions capable of being encapsulated in one or more tags 109a. For example, the attributes for indicating the device is in a roaming status may be expressed as "is_roaming" variable of type Boolean that has a logical determinative value of "TRUE" or "FALSE." As another example, the attribute for representing the platform version may be expressed as a "platform_version" variable with a string value (e.g., "2.2" for representing version 2.2).

In certain embodiments, the notification-enabled services 103a-103n registered to the platform 113 access it in order to configure the one or more tagging rules. The tagging rules define the various criteria for the generation of tags to be associated with respective registered devices 101a-101n. The one or more tags 109a are data elements, such as those conforming to a specific data structure or suitable as metadata, temporarily associated with each device on an automatic basis depending on the result of the evaluation process described above. The tagging rules are configured globally for each of the respective services 103a-103n. The configuration process may include, for example, the sending of one or more requests to the platform 113 that contain the various logical expression(s) and the associated tag(s) to be assigned for encapsulating the expression. Once assigned, the evaluation process of the expression may occur, including determining a true (Boolean), string value, or the like.

The expressions may be expressed according to various syntaxes or programming semantics, including mark up languages such as extensive markup language (XML), as a tree of elements, or any other methods. Some examples are shown below in pseudo-language form. By way of example, the "=>" symbol as shown in the example expressions indicates that "if the expression is 'TRUE,' then associate the following tag(s) with a given device."

is_roaming==true=>"roaming"
platform_vendor=="Apple" &&
 platform_version>="4.0"=>"iphone4", "iphone"
platform_vendor=="Apple" &&
 platform_version<"4.0="iphone"
notification_bearer=="sms" &&
 is_roaming==true=>"sms_with_roaming"
subscriber_home_city=="New York" &&
 subscriber_home_country=="US" &&
 is_roaming=="true"=>"nyc_promotion"

The various expressions, which are encapsulated as one or more tags 109a, may be developed by the device vendor, operator, service developer and/or maintained as a library of properties for use in connection with execution of a notification-enabled service 103a-103n by devices 101a-101n and their corresponding applications 107a-107n. It is noted that the tagging rules may be configured at an initial time of registration by the notification-enabled service 103a-103n or subsequently.

In addition to the above described tags 109a, some of the documented tags 109a may be those that change automatically when the determined state of the subscriber and/or notification recipient changes. Device state changes for example, may include those changes pertaining to the current status of the device relative to a given data network to which a respective device 101a-101n is configured, a change in subscription preferences, a network operator specific change, etc. Geographical/location data changes may be encapsulated as tags 109a as "geo_latitude=<value>" or "geo_longitude=<value>." As another example, time zone data may be encapsulated as "current_time_zone=<value>." Subscriber advertisement preferences may be captured as "global_ads_opted_out." Tags 109a featuring such nomenclature, expressions and references may therefore be evaluated against specified tag filters.

As part of the registration process, when a given device 101a-101n registers with the universal notification platform 113, it sends information about its operating system/platform and other capabilities (e.g., as tokens). Per the execution described above, the platform 113 evaluates the rule(s) configured for the associated notification-enabled service 103a-103n for that device 101a-101n and assigns the appropriate tag(s) as part of the registration data 109. The tags 109a depend on the attributes used in the expression(s) evaluated at the registration. Hence, if one or more attributes involved in these expression(s) changes, then the tagging rules are re-evaluated, resulting in the updating of the tags as associated with respective notification recipients. The re-evaluation process can be performed automatically or upon request, such as by the recipient application.

It is noted, with respect to the registration process that the universal notification platform 113 serves as a proxy or intermediate service for the devices 101a-101n and/or the notification-enabled services 103a-103n; enabling notification messages to be routed to one or more devices 101a-101n accordingly by the universal notification platform 113. It is also noted that the tagging rules, as maintained by the platform 113 for enabling tag generation, can be hierarchical—i.e., some of the rules are offered by the device 101a-101n carrier/network operator while others are prescribed by the notification-enabled service 103a-103n.

Once the tags are established for each respective device 101a-101n, the notification-enabled service is able to perform one or more of: querying the registration database 109 to determine the list of tags 109a associated a given device; send a notification to all subscribers based on their associated tags; restrict the delivery of notifications based on use of filter expressions against notification recipients based on their associated tag references, i.e., address only iPhone® tagged devices, send a notification that uses some Blackberry®-specific elements, send the notification only to non-roaming tagged subscribers; generate conditional notification messages, i.e., if the service wants to send one notification to all subscribers with additional elements specific to iPhone® with iOS 4.0 or higher, it would include a conditional part into the notification message that uses the tag filter; restrict messaging by geographic area, i.e., apply a tag filter indicating specific "geo_longitude" and "geo_latitude" tags and their values with the function "within_range_from" (hypothetical function taking two geo-locations and returning true if they are within certain specified maximum distance).

As shown in FIG. 1, the system 100 comprises user equipment (UE) 101 or devices having connectivity to the universal notification platform 113 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, universal notification platform 113 and notification-enabled service 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
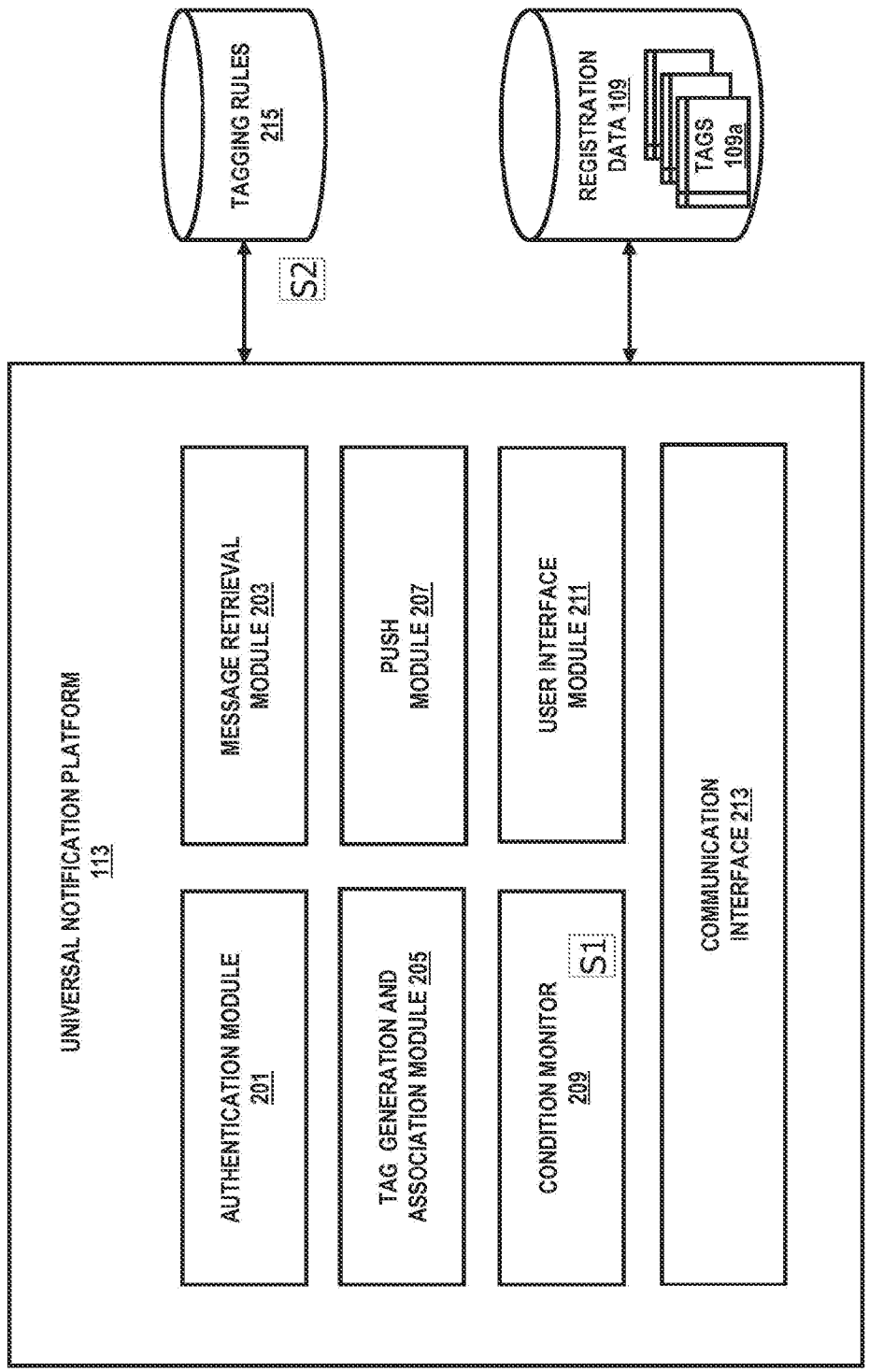
FIG. 2 is a diagram of the components of universal notification platform, according to one embodiment.

FIG. 2 is a diagram of the components of the universal notification platform 113, according to one embodiment. By way of example, the platform 113 includes one or more components for facilitating automated processing of targeted (push) notification messages for integration with notification recipients of different type and function. It is contemplated that the functions of these components may be combined in one or more components or performed by other components of equivalent functionality. In this embodiment, the universal notification platform 113 includes an authentication module 201, message retrieval module 203, tag generation and association module 205, push module 207 (although only one push module 207 is illustrated in FIG. 2, in some embodiments, there may be multiple push modules 207 with each corresponding to an underlying push mechanism supported by platform 113), condition monitor 209, user interface module 211 and communication interface 213. In addition, the universal notification platform 113 also accesses tagging rules data from a database 215 as well as a registration database 109 for maintaining information pertaining to notification recipient (e.g., device) registrations.

In one embodiment, an authentication module 201 authenticates users, user devices 101*a*-101*n* and notification-enabled services 103*a*-103*n* for interaction with the universal notification platform 113. In embodiments where the user devices 101*a*-101*n* need not be authenticated, the authentication module 201 may be used to identify (rather than to authenticate) the appropriate notification recipients for interaction with the universal notification platform 113. The above described registration process is facilitated, at least in part, by the authentication module 201. By way of example, the authentication module 201 receives a request to subscribe to the platform 113 for enabling the directing/routing of notification messages to devices 101. The subscription process, from the perspective of the subscribing user device 101, may include sending information (e.g., tokens) for identifying the operating system or platform of the device, a version number corresponding to the operating system or platform, a vendor name or vendor identifier associated with the user device, a model number of the device, a carrier or operator name or identifier, etc. This information may be passed onto the authentication module 201 by way of a request/query process with the device 101, an extraction interaction, reading of device subscriber identity module (SIM) credentials, etc. Additional information may also be associated with the device data as indicated by the network operator or communications carrier, including roaming status data, subscriber home country, state and city information, current location data, etc. Preferences and settings information may be referenced to a specific user, user device 101, or combination thereof, and maintained as registration data 109.

From the perspective of the notification-enabled service 101, the registration process facilitated by the module 201 may include the sharing of data for enabling routing of messages by the platform 113, including: a listing of user devices 101*a*-101*n* to which notification messages are to be sent, a subscription status, a periodicity of push messaging, reporting requirements, etc. It is contemplated, in certain embodiments, that the notification-enabled service 103 may specify various message compilation preferences to be performed by the platform 113, including the location of specific databases in which certain content is held, alternative data sources, etc. Of note, this feature may be suited for accommodating dynamic push messaging, wherein notification messages featuring multiple content types (e.g., images, media, text) may be dynamically compiled at the time of push rather than prior.

The authentication process performed by the module 201 may also include receiving and validating a login name and/or user identification value as provided or established for a particular user (device user or notification developer) during a subscription or registration process with the platform 113. The login name and/or user identification value may be received as input provided by the user by way of a graphical user interface to the platform 103 (e.g., as enabled by user interface module 215). Registration data 217 for respective subscribers, which contains pertinent user or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier. The ability of the platform 113 to associate devices 101 with a particular notification-enabled service 103 may be based on a predetermined notification agreement also maintained by the authentication module (e.g., as registration data 109.

For the purpose of example, registration data 109 as processed/received by the authentication module 201 includes information pertaining to the notification recipient, a user of the notification recipient, a notification-enabled service, a developer of the notification-enabled service, or a combination thereof. In addition, the authentication module 201 may also receive one or more tagging rules to be associated with specific subscribers. By way of example, the authentication module 201 maintains the tagging rules in the appropriate database, while operating in connection with a tag association module 205 to ensure proper association of a set of tagging rules 215 with a subscriber by way of one or more tags 109a.

In one embodiment, a message retrieval module 203 receives notification messages from the one or more notification-enabled services 103a-103n based on the registration data 109. By way of example, the message retrieval module 203 may operate in connection with a communication interface 213 for establishing a message delivery channel. The delivery channel may serve as a port or gateway through which specific content, messages or other data is to be received. In certain instances, the message retrieval module 203 may be configured to compile messages from varying sources at the discretion of the notification-enabled service 103.

In addition, when a particular service 103a-103n sends a notification message, the message retrieval module 203 determines the notification message payload(s) as well as parses/determines any tag filter expressions associated with the message. The expressions can apply to the notification message itself as well as to individual portions of the payload. Upon detection, the tag filter expressions may be passed on to the tag association and generation module 205 accordingly for processing and interpretation. It is noted, therefore, that the message retrieval module 203 is configured to interpret tag filters/expressions specified in association with a given message by a sending service 103. By way of example, the message retrieval module 203 may interpret tag filters expressions such as:

!iphone
   This expression indicates that the message is to be routed to any device but NOT iPhones iphone4
   This expression indicates that the message is to be routed to only iOS 4.0+ devices iphone && !roaming && within_range (geo_longitude, geo_latitude, 45.47229, −73.519306, "3 km")
   This multi-dimensional filter indicates that the message is to be routed to only iPhone® devices that are NOT roaming AND within the specified geographic range nyc_promotion && office_hours (subscriber_timezone)
   This multi-dimensional filter indicates that the message is to be routed to only those devices corresponding to a particular promotion AND during specified hours A tag generation and association module 207, condition monitor 209 and push module 207, in certain embodiments, operate in connection with the message retrieval module 203. The tag generation and association module 203, for example, facilitate automated generation of tags 109a to be associated with a registered/subscribed device 101 based on the tagging rules 215. In addition, the module 203 facilitates an evaluation process for determining which devices correspond to the particular expression/tag filters received by the message retrieval module 203. Evaluation may include performing an analysis or lookup of tags 109a as maintained with respect to registration data 109 to determine which devices correspond to the expression. For example, when the "!iphone" expression as indicated above is provided in connection with a notification message, the analysis or lookup process may entail retrieving a list of all subscribed devices that are not iPhone® operating system tagged. The restricted list is then passed on to a push module 207 for execution of the notification message according to the predetermined schedule—i.e., immediately or at a later time.

It is noted that there are two types of expressions and two evaluation processes capable of being performed by the tag generation and association module 203. One process is evaluating the attribute-based, logical expressions upon recipient registration as well as during runtime when some condition(s) change. The evaluation at this stage results in one or more tags being temporarily associated with the registration. The second type of expression is associated with the outgoing notification message. This expression is based on the tags previously associated with the registrations, wherein the expression effectively defines the "routing" for this particular message. Re-evaluation of the expression(s) of the first type does not happen for every message being sent, but rather when one or more attributes involved in these expressions change (or upon explicit request from the service provider). Such changes may be observed by a condition monitor 209.

The condition monitor 209 monitors attribute changes that may affect the out of an expression, and thus the generation of a tag. Resultantly, tags may be removed or added accordingly by the tag generation and association module 205 based on conditions (e.g., logical conditions, environmental conditions, network conditions) as expressed. This also corresponds to adaptation of the list of notification recipients to which messages are to be directed to by the push module 207. For example, for the iphone && !roaming && within_range (geo_longitude, geo_latitude, 45.47229, −73.519306, "3 km") expression shown above; a device that was previously within the specified range but currently out of the range is not enabled for receipt of the notification message. The condition monitor 209 may retrieve device, network or other status information by performing a periodic query. Alternatively, devices 101a-101n or the operator network (e.g., server) may be configured to provide updated state data in response to specific state/event occurrences.

In one embodiment the user interface module 211 enables presentment of a graphical user interface for facilitating the device or notification-enabled service provider registration process. By way of example, the user interface module 215 generates the interface in response to application programming interfaces (APIs) or other function calls corresponding to the browser application or web portal application of the user devices 101a-101n; thus enabling the display of graphics primitives. Of note, the user interface module 215 may operate in connection with the authentication module 201 to permit data entry and exchange for enabling the aggregation of attributes (e.g., tokens) to be associated with a given set of registration data 109.

In one embodiment, a communication interface 213 enables formation of a session over a network 105 between the universal notification platform 113 and the interface enabled by the user interface module 211. By way of example, the communication interface 213 executes various protocols and data sharing techniques for enabling collaborative execution between a subscriber's user device 101a-101n (e.g., mobile devices, laptops, smartphones, tablet computers, desktop computers) and the universal notification platform 113 over the network 105.

Figure 3A:
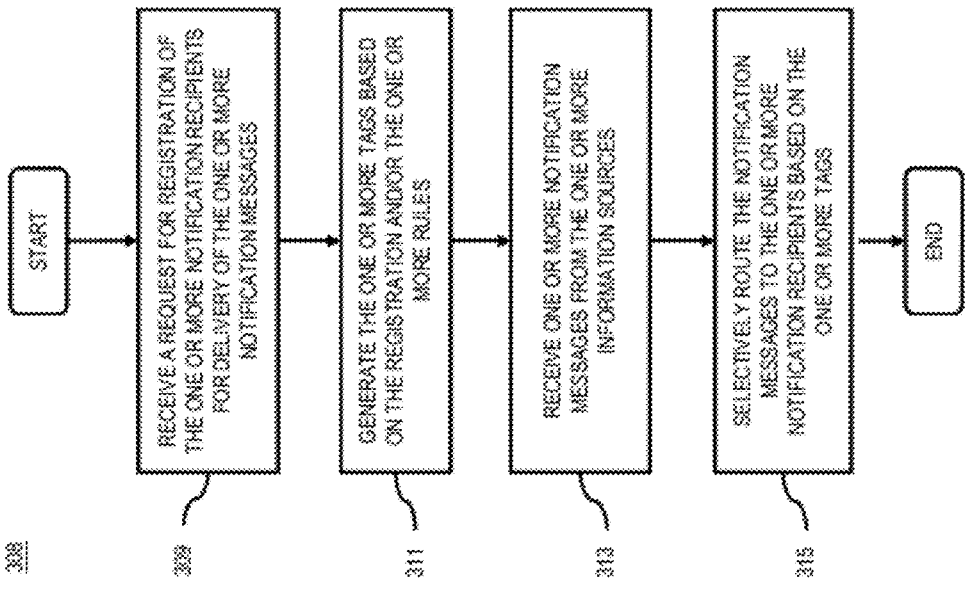
FIGS. 3A-3C are flowcharts of a process for facilitating automated processing of targeted (push) notification messages for integration with notification recipients of different type and function, according to various embodiments.
Figure 3B:
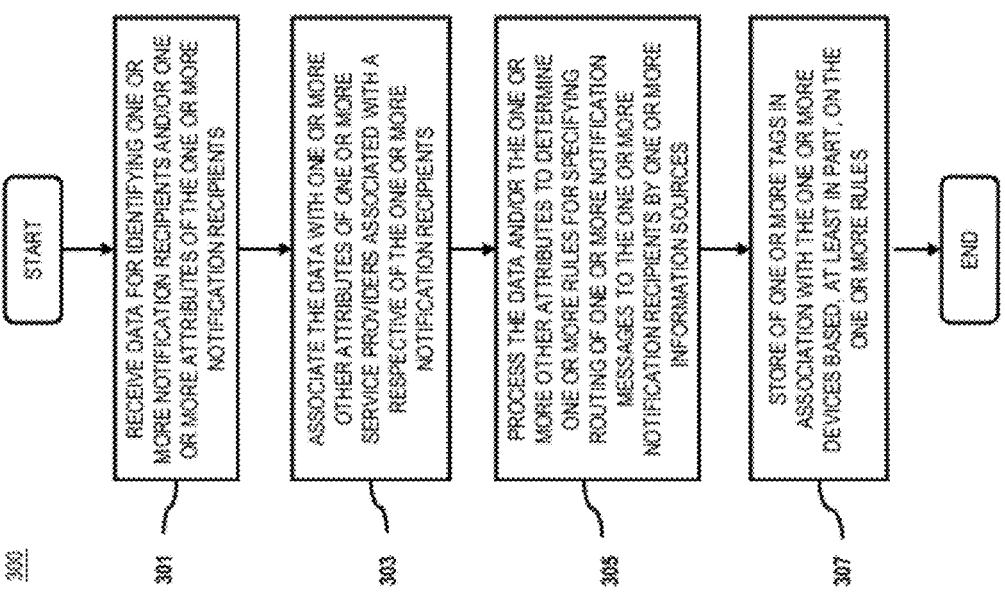
Figure 3C:
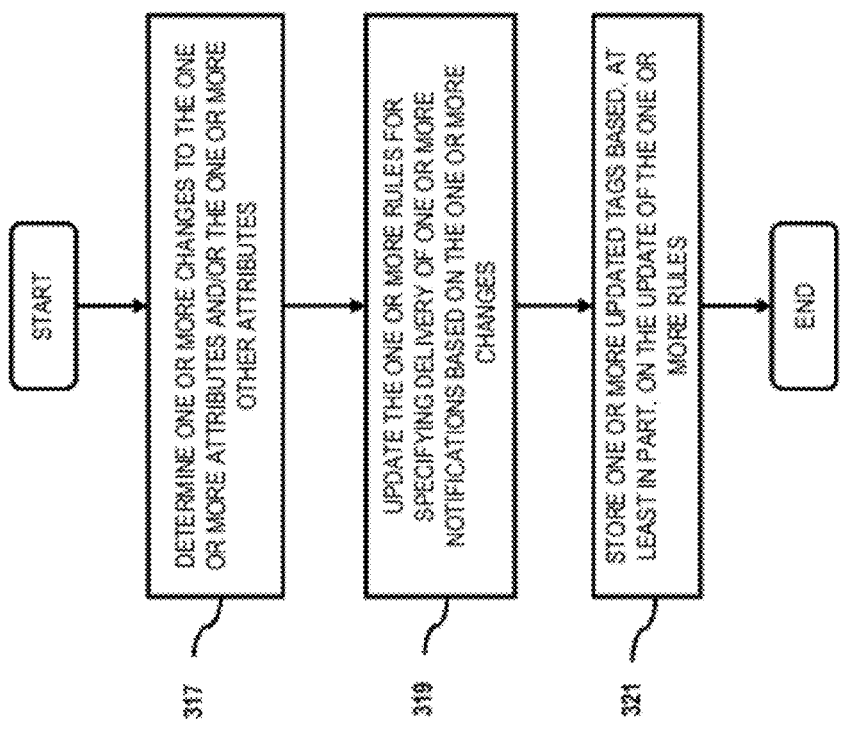
Figure 7:
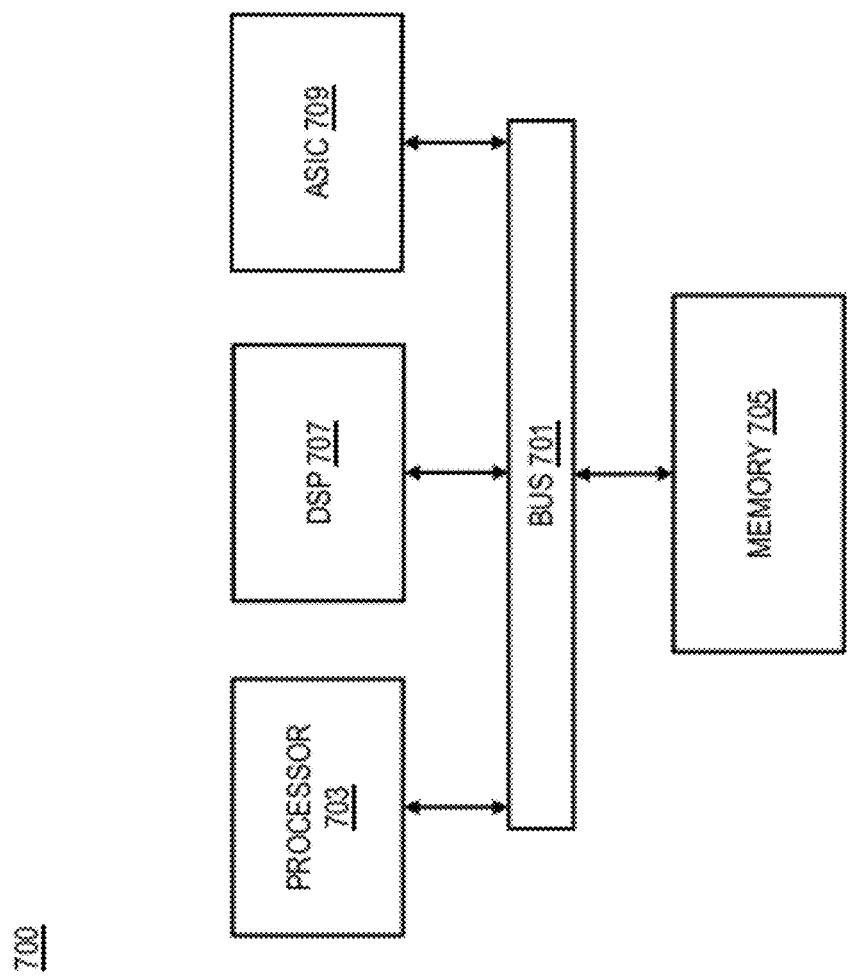
FIG. 7 is a diagram of a chip set that can be used to implement an embodiment of the invention.

FIGS. 3A-3C are flowcharts of a process for facilitating automated processing of targeted (push) notification messages for integration with notification recipients of different type and function, according to various embodiments. In one embodiment, the universal notification platform 113 performs the process 300 independently (e.g., as a hosted or cloud-based solution) or in connection (e.g., as an integrated solution) with the notification-enabled service 103; and is implemented in, for instance, a chip set including a processor and a memory as shown in FIG. 7. For the purpose of illustration, the processes are described with respect to FIG. 1. It is noted that the steps of the process may be performed in any suitable order, as well as combined or separated in any suitable manner.

In step 301 of process 300 (FIG. 3A), the universal notification platform 103 receives data for identifying one or more notification recipients and/or one or more attributes of the one or more notification recipients. As mentioned previously, this data may be provided as tokens and the attributes of the one or more notification recipients may include details regarding a platform, a version, a vendor, a model, a carrier or a combination thereof. In step 303, the platform 103 also associates the data with one or more other attributes of one or more service providers associated with a respective of the one or more notification recipients. The one or more other attributes may include details regarding a status of the one or more notification recipients, one or more users of the notification recipients (e.g., based on profile data maintained as part of the registration database 109), or a combination thereof with respect to the service provider. The service provider may include the device carrier, network operator, communications services provider or other party associated with a device 101 subscribed to receive a push messages from an information source such as a notification-enabled service 103. By virtue of the relationship with the device 101, the service provider may contribute attributes such as geo-location data for the device 101, roaming status data, subscriber home state and city information, peak hour information, parental and/or privacy control information (e.g., message and/or content block settings), etc.

In another step 305, the universal notification platform processes the data and/or the one or more other attributes to determine one or more rules for specifying routing of one or more notification messages to the one or more notification recipients by one or more information sources. The one or more information sources include the notification-enabled services 103a-103n. As mentioned previously, the rules may include various logical expressions (e.g., string values, Boolean values) for enabling the analysis of notification messages. Per step 307, the platform 113 further stores one or more tags 109a in association with the one or more notification recipients based, at least in part, on the one or more rules. As described previously, the tag generation and storing includes, for example associating the tags 109a with one or more subscribing devices 101 in connection with registration data 109.

In step 309 of process 308 (FIG. 3B), the platform 113 receives a request for registration of the one or more notification recipients for delivery of the one or more notification messages. As part of the request, the one or more notification recipients or associated service provider may provide details regarding the device and/or operator network. Per step 311, the platform 113 generates one or more tags based on the registration and/or the one or more rules.

In step 313, having generated the various tags 109 and associated it with the registration data 109, the platform 113 receives one or more notification messages from the one or more information sources (e.g., services 103a-103n). Per step 315, the platform 113 selectively routes the notification messages to the one or more notification recipients 101a-101n based on the one or more tags. In certain embodiments, the service sends a notification message in conjunction with the notification payload(s) and/or the tag filter expressions. The payload may include a specification of the various data formats of the notification messages. For each connected notification recipient 101a-101n, the notification messages are evaluated against the expression over the set of tags 1109a. In case of a match, the message gets sent to that specific notification recipient 101a-101n, and is then provided for processing to the receiving application 107a-107n (e.g., e-mail client, SMS client, multi-media messaging service (MMS) client).

In step 317 of process 316, the platform 113 determines one or more changes to the one or more attributes of notification recipients 101a-101n, the one or more other attributes of the service provider associated with the notification recipients, or a combination thereof. Changes detected by the platform 113 may include device status or state changes such as roaming status, network availability status, device emergency mode status, data connectivity status, etc. It is contemplated, in future embodiments, that device usage states may also be considered in order to account for changes in application requirement or use. By way of example, the registration data 109a may include a preferred data format for receiving push messages relative to a determined time of day or detected user/device activity. In an exemplary use case, the tagging rules 215 may indicate that the push message is to received via an e-mail client application when the user is engaged in a meeting (e.g., based on a combination of time, location, or current application use data), while received as a SMS message if the user is jogging (e.g., based on a combination of motion or location data).

In step 319, based on the one or more changes, the platform 113 updates the one or more rules for specifying delivery of the one or more notifications. The update may include specifying new geographic location requirements, roaming conditions, etc. Per step 321, the platform stores the one or more updated tags based on the update of the one or more rules. This may include removing or adding of tags 109a, or the appending of data to an existing tag 109a. As such, the updated tags 109a are associated with the registration data 109 for respective notification recipients 101a-101n to enable accounting of dynamic changes over time.

FIG. 4 is a diagram depicting a registration process of the system of FIG. 1, according to one embodiment. For example purposes, interaction between the universal notification platform 407 and a native notification platform 405 as well as a notification-enabled service 413 are depicted. It is noted that the native notification platform 405 may include a preferred notification platform of a given mobile device 401, such as an employer based platform or other the like for managing push messaging for multiple clients. The universal notification platform 407 may therefore interact with the native platform 405 to perform or enable the same push messaging capabilities without the necessity of generating multiple instances of the push message to accommodate differing messaging formats, application 403 requirements and different operator networks 415a-415b or carriers and the like.

By way of example, the registration process is multi-faceted, and includes registration steps performed singularly or in tandem as follows:

1. The mobile device 401 having operable thereon a messaging application 403 registers with the native notification platform 405, corresponding to step 404. In addition, the subscription/registration process, per step 402, includes a registration of the mobile device 401 with the universal notification platform 407. The registration data 409 is maintained, and may include device information including various attributes of the device (e.g., carrier data, version data, platform data, etc.).
2. The universal notification platform 407 registers with the native notification platform 405, per step 406. By way of this registration, the notification-enabled service 413 affiliated with the native notification platform 405 is permitted to engage with the universal notification platform 407 directly and instead of the native platform 405. Consequently, per the execution described with respect to the processes of FIGS. 3A-3C, the auto-tagging rules (tagging rules) may be presented to the universal notification platform 407. This corresponds to step 408. Once the rules are specified—i.e., as one or more expressions—the registration data 409 may be maintained by the universal notification platform 407 in association with the one or more tags 411. In this way, conditional and dynamic messaging execution may be supported.

It is noted that registration step 406, depicted by unidirectional line 406, may be reversed in certain instances or unidirectional. In the former case, the native notification platform 405 may initiate a registration process with the universal notification platform 407, while in the latter case the registration is performed on a peer-to-peer or mutual registration basis.

FIG. 5 is a diagram depicting a targeted (push) notification message routing process of the system of FIG. 1, according to one embodiment. For example purposes, interaction between the universal notification platform 509 and multiple native notification platforms 503 and 505 as well as a notification-enabled service 513 are depicted. It is noted that the native notification platforms may be configured to enable push messaging for a plurality of different mobile devices 501a-501n, with each capable of supporting only a specific messaging type (e.g., SMS vs. Apple Push Notification based messaging). Furthermore, the different devices may correspond to varying operator networks 507a and 507b. The universal notification platform 407 may therefore interact with the native platforms 503 and 505 in the capacity of a proxy, wherein notification messages provided by a service 513 may be adapted to accommodate differing devices 501a-501n, operator networks 507a and 507b, and other conditions.

By way of example, the notification message routing process includes steps performed singularly or in tandem as follows:
1. The notification-enabled service 513 affiliated with the native notification platforms 503 and 507 sends a notification message. The payload may include the content of the notification message along with various data for indicating the target devices 501a-501n to which they should be directed, data statistics, etc. Along with the notification message, the notification-enabled service 513 specifies one or more tag filters—i.e., conditions and/or expressions for restricting or filtering the list of recipient devices 501a-501n based on said conditions. These actions correspond to step 502. Of note, the universal notification platform 509 receives the notification message as opposed to the native notification platforms, which lack the capability of condition based, dynamic push message routing.
2. The universal notification platform 509 evaluates the tag filter expressions for each device/user maintained in the registration database 511, per step 504. The evaluation may include determining the one or more devices having the one or more attributes corresponding to the one or more data formats specified as part of the payload. In addition, the tag filter expressions may be processed with respect to one or more tagging rules for rendering a list of devices matching the criteria. The evaluation and process is performed based on the tags 515 maintained along with the registration data 511.
3. Once the list is generated, the notification message is sent to the corresponding native notification platforms 503 and 505, and further on to the devices matching the tag filter expressions (e.g., the list). This corresponds to steps 506 and 508.

The above described technical implementation is based on the abstraction of the connection (e.g., the message notification connection/registration of the subscriber with the notification platform), so that the push messaging process is performed independently of the native notification platform 503 and 505. By way of example, there may be five customers using mobile devices 501a-501e, where 501a and 501b are iPhone® based devices and therefore rely upon the APN notification mechanism. 501c is an Android™ based device that relies on C2DM notifications, while 501d and 501e are a Blackberry® smartphone and a generic Java™ platform micro edition (J2ME), relying on Blackberry® Push Messaging and SMS push notification respectively. To enable the service provider to develop an application for each of these devices for use with the notification-enabled service 513—i.e., notifications to all customers or some of the devices—the provider integrates with the universal notification platform 509 on both device and server side to do so.

It is noted that execution of the universal notification platform, per this exemplary use case, is enabled by decoupling the message routing configuration from the message sending process. For example, the process of generating and associating tags with the various notification recipients 501a-501e is performed independent of the message routing process; wherein the routing is accounted for by the platform incidental to the tag generation process as one or more tagging rules.

The same approaches and methodologies as presented above may be applied to other communication scenarios such as messaging schemes requiring hypertext transfer protocol (HTTP). Under this scenario, the Web application once deployed into a Web container would define the tagging rules for the incoming requests. The Web server would then apply these tagging rules to every incoming HTTP request and "tag" it with zero or more values. These values can be used either by the Web application itself or by the Web container to allow caller-specific (context-specific) handling of the requests.

Still further, for the example above, a keep-alive (persistent) connection may be established by the Web client (browser, rich internet application) to the Web server. The intermediate service—i.e., the platform 113—can use the connection to perform the following: (1) request a "registration," (2) pre-calculate tags based on this registration request, and (3) automatically insert these tags in every request sent via the established connection. This automation is made possible because the connection is persistently from the same client. As a result, the amount of work required to facilitate the client-server interaction is reduced because some of the required calculations/lookups will be done only when the first request comes in but not for subsequent requests.

The processes described herein for facilitating automated processing of targeted (push) notification messages for integration with notification recipients of different type and function may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
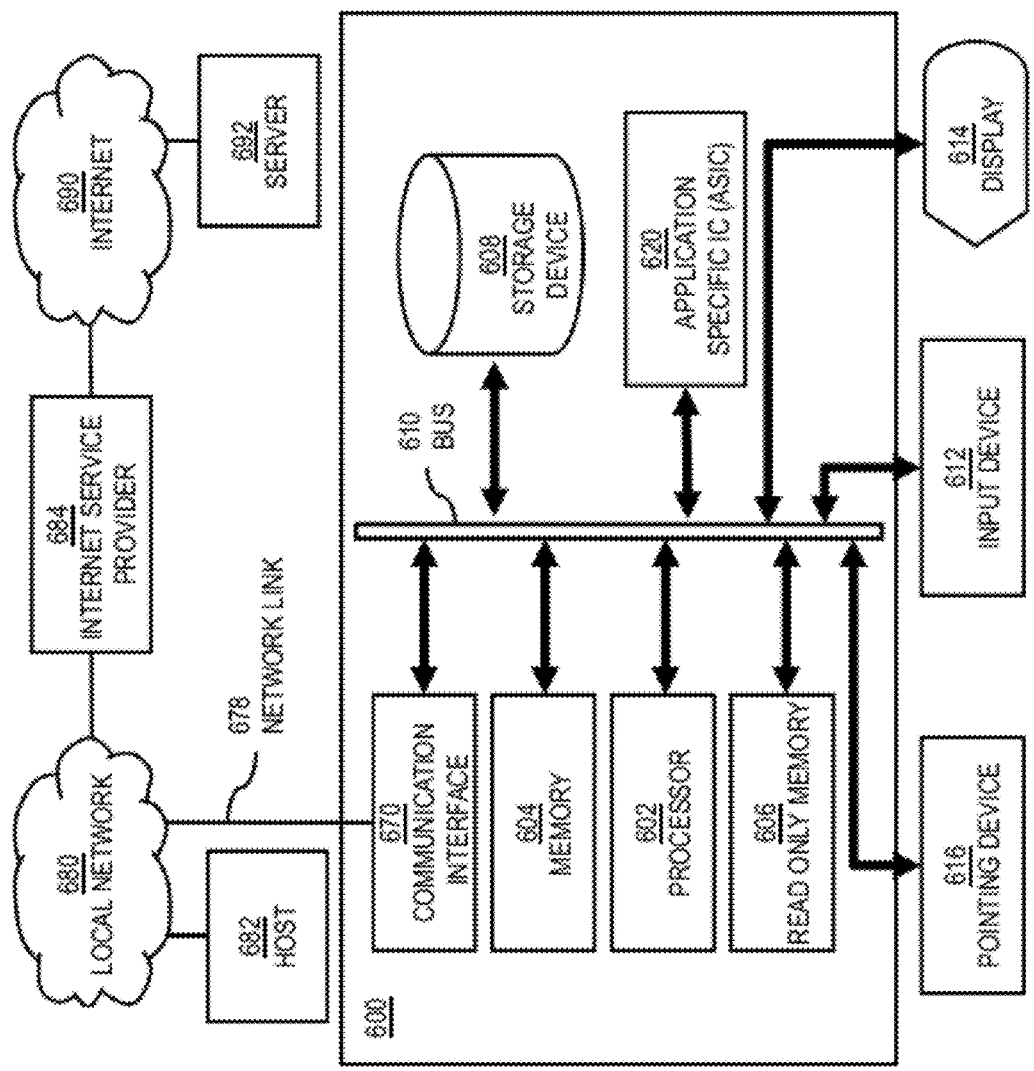
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to facilitate automated processing of targeted (push) notification messages for integration with devices of different type and function as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of facilitating automated processing of targeted (push) notification messages for integration with devices of different type and function.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to facilitate automated processing of targeted (push) notification messages for integration with devices of different type and function. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for facilitating automated processing of targeted (push) notification messages for integration with devices of different type and function. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for facilitating automated processing of targeted (push) notification messages for integration with devices of different type and function, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for facilitating automated processing of targeted (push) notification messages for integration with devices of different type and function to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to facilitate automated processing of targeted (push) notification messages for integration with devices of different type and function as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of facilitating automated processing of targeted (push) notification messages for integration with devices of different type and function.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to facilitate automated processing of targeted (push) notification messages for integration with devices of different type and function. The memory 705 also stores the data associated with or generated by the execution of the inventive steps.

Figure 8:
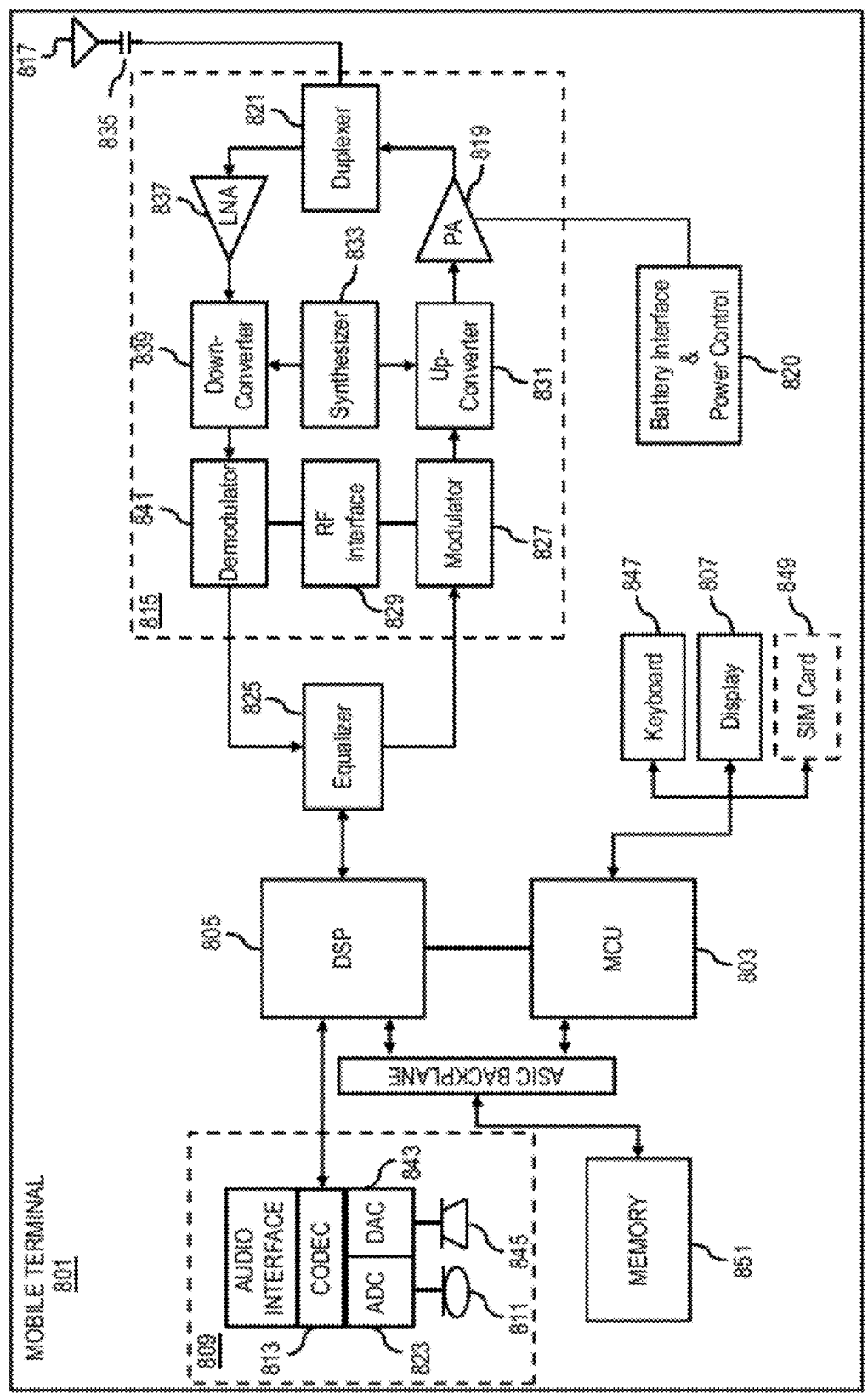
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of facilitating automated processing of targeted (push) notification messages for integration with devices of different type and function. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of facilitating automated processing of targeted (push) notification messages for integration with devices of different type and function. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to facilitate automated processing of targeted (push) notification messages for integration with devices of different type and function. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving data from one or more notification recipients, the data comprising at least one or more attributes pertaining to a network status of the one or more notification recipients;
   in an instance the data comprising the one or more other attributes pertaining to the network status of the respective notification recipients satisfies a rule, apply a tag associated with the rule to the respective notification recipient;
   monitoring the data comprising at least the one or more attributes pertaining to the network status of the one or more notification recipients and updating tags according to changes to the one or more attributes; and
   identifying a subset of notification recipients to which to route one or more notification messages, wherein the subset of notification recipients is identified based on conditions relating to a presence of one or more tags associated with notification recipients.

2. The method of claim 1, further comprising:
   receiving a request for registration of the one or more notification recipients for delivery of the one or more notification messages.

3. The method of claim 1, wherein the rule includes one or more logical expressions for evaluating the notification messages.

4. The method of claim 1, further comprising:
   receiving the one or more notification messages from one or more information sources.

5. The method of claim 4, wherein the one or more notification messages are received as a payload indicating one or more specified data formats.

6. The method of claim 1, wherein the data include, at least in part, one or more tokens.

7. The method of claim 1, wherein the data further comprises attributes of the one or more notification recipients include, at least in part, details regarding a platform, a version, a vendor, a model, a carrier or a combination thereof.

8. The method of claim 1, further comprising:
   causing, at least in part, a removal or addition at least one tag based, at least in part, on changing network conditions.

9. An apparatus comprising:
   at least one processor, and
   at least one memory including computer program code for one or more programs, the at least one memory and the computer program code configured to, with the at least one processor, cause the apparatus to perform at least the following, receive data from one or more notification recipients, the data comprising at least one or more attributes pertaining to a network status of the one or more notification recipients;

in an instance data comprising the one or more other attributes pertaining to the network status of the respective notification recipients satisfies a rule, apply a tag associated with the rule to the respective notification recipient;

monitor the data comprising at least the one or more attributes pertaining to the network status of the one or more notification recipients and updating tags according to changes to the one or more attributes; and identify a subset of notification recipients to which to route one or more notification messages, wherein the subset of notification recipients is identified based on conditions relating to a presence of one or more tags associated with notification recipients.

10. The apparatus of claim 9, wherein the apparatus is further caused to:

receive a request for registration of the one or more notification recipients for delivery of the one or more notification messages.

11. The apparatus of claim 9, wherein the one or more rules include one or more logical expressions for evaluating the notification messages.

12. The apparatus of claim 9, wherein the apparatus is further caused to:

receive the one or more notification messages from the one or more information sources.

13. The apparatus of claim 12, wherein the one or more notification messages are received as a payload indicating one or more specified data formats.

14. The apparatus of claim 9, wherein the data include, at least in part, one or more tokens.

15. The apparatus of claim 9, wherein the data further comprises attributes of the one or more notification recipients include, at least in part, details regarding a platform, a version, a vendor, a model, a carrier or a combination thereof.

16. The apparatus of claim 9, wherein the apparatus is further caused to:

cause, at least in part, a removal or addition of at least one tag based, at least in part, on changing network conditions.

\* \* \* \* \*

UNITED STATES PATENT AND TRADEMARK OFFICE
CERTIFICATE OF CORRECTION

| | |
|---|---|
| PATENT NO. | : 9,088,624 B2 |
| APPLICATION NO. | : 13/149421 |
| DATED | : July 21, 2015 |
| INVENTOR(S) | : Grigoriev |

It is certified that error appears in the above-identified patent and that said Letters Patent is hereby corrected as shown below:

In the claims:

Column 26,
Line 9, "from the one" should read --from one--.

Signed and Sealed this
First Day of March, 2016

Michelle K. Lee
*Director of the United States Patent and Trademark Office*